(12) United States Patent
Fernandez

(10) Patent No.: US 7,269,259 B1
(45) Date of Patent: Sep. 11, 2007

(54) METHODS AND APPARATUS FOR AUTHENTICATING DATA AS ORIGINATING FROM A STORAGE AND PROCESSING DEVICE AND FOR SECURING SOFTWARE AND DATA STORED ON THE STORAGE AND PROCESSING DEVICE

(75) Inventor: Alberto J. Fernandez, Miami, FL (US)

(73) Assignee: XTex, Incorporated, Miami, FL (US)

( * ) Notice: Subject to any disclaimer, the term of this patent is extended or adjusted under 35 U.S.C. 154(b) by 626 days.

(21) Appl. No.: 09/562,333

(22) Filed: May 1, 2000

(51) Int. Cl.
H04L 9/00 (2006.01)

(52) U.S. Cl. .......... 380/264; 380/258; 380/277; 380/286; 713/165; 713/167; 713/168; 726/26; 726/30

(58) Field of Classification Search ........ 713/200–202, 713/162, 193, 176–178, 189, 165, 167, 168, 713/155; 705/51–59, 71, 205; 709/229; 380/44, 264, 258, 277, 286; 717/171, 174–178; 707/205; 726/26, 30; 345/541

See application file for complete search history.

(56) References Cited

U.S. PATENT DOCUMENTS

| | | | | |
|---|---|---|---|---|
| 5,412,718 A * | 5/1995 | Narasimhalu et al. | ........ | 705/51 |
| 5,615,061 A * | 3/1997 | Singh | .......... | 360/60 |
| 5,649,204 A * | 7/1997 | Pickett | .......... | 717/167 |
| 5,661,800 A * | 8/1997 | Nakashima et al. | ........ | 713/200 |
| 5,809,145 A * | 9/1998 | Slik et al. | ........ | 705/52 |
| 5,917,908 A * | 6/1999 | Takenaka et al. | ........ | 713/190 |
| 5,917,910 A * | 6/1999 | Ishiguro et al. | ........ | 705/57 |
| 6,321,237 B1 * | 11/2001 | Yamamoto et al. | ........ | 707/205 |
| 6,378,031 B1 * | 4/2002 | Kuno et al. | ........ | 711/4 |
| 6,542,167 B1 * | 4/2003 | Darlet et al. | ........ | 345/762 |
| 6,571,339 B1 * | 5/2003 | Danneels et al. | ........ | 713/201 |
| 6,574,732 B1 * | 6/2003 | Steinberg et al. | ........ | 713/193 |
| 2001/0012362 A1 * | 8/2001 | Marzahn | ........ | 380/42 |

FOREIGN PATENT DOCUMENTS

GB 2 264 373 A * 5/1992

* cited by examiner

Primary Examiner—Kim Vu
Assistant Examiner—Beemnet W Dada
(74) Attorney, Agent, or Firm—Priest & Goldstein, PLLC

(57) ABSTRACT

Techniques are described for using unique features of a storage medium for authentication of data as originating from the storage medium, and also for installing software and data to a storage medium in a way which inhibits unauthorized copying of the software and data to another storage medium. Cryptoprocessing keys are created using unique features of the storage medium such as location information related to storage of selected elements of a software installation on the storage medium, or alternatively defective block information relating to the storage medium. The cryptoprocessing keys are used to encrypt data for transmission to a remote server. The remote server uses the cryptoprocessing keys to decrypt the data and authenticates the data as having been encrypted with the correct keys. In order to control operation of software on a storage medium, location information unique to the storage medium is employed to create links between software modules comprising the software. If the software is copied to a different storage medium, the location information used in the links will be incorrect and the links between the modules will contain inaccurate information, preventing the software from operating properly. Location information unique to a storage medium can also be used to create cryptoprocessing keys for protection of data. If data encrypted using the keys is copied to a new storage medium, the location information in the new storage medium will not be the same as was used to create the original keys and the data will not be able to be decrypted at the new location.

20 Claims, 9 Drawing Sheets

METHODS AND APPARATUS FOR AUTHENTICATING DATA AS ORIGINATING FROM A STORAGE AND PROCESSING DEVICE AND FOR SECURING SOFTWARE AND DATA STORED ON THE STORAGE AND PROCESSING DEVICE

FIELD OF THE INVENTION

The present invention relates generally to improvements in data security. More particularly, the invention relates to techniques for securely storing unique images of data and software on a storage medium.

BACKGROUND OF THE INVENTION

The use of computers and other data processing equipment to process information and perform communication has been widespread for many years and continues to become more and more prevalent. Computers are increasingly used to transfer private data, including data used to perform financial transactions involving significant sums. Privacy and authentication is vitally important in such transactions. It is highly undesirable for an unauthorized party to successfully imitate an owner of a checking account or brokerage account and gain the opportunity to conduct unauthorized transactions.

Encryption is commonly used to protect information during transactions conducted by computers, but encryption does not necessarily provide authentication. Even in cases where the financial entity servicing the account authenticates itself through the use of a certificate, the customer owning the account is typically authenticated through the use of a username and a password. It is often possible for a skilled attacker to gain access to a user's private passwords and other authentication information. Such information may even be gathered by various Internet services which monitor a user's Internet activities in order to provide services and conveniences for the user. Once this information is gathered, it is subject to being attacked, and if the service which gathered the information employs inadequate security precautions, private information of hundreds or thousands of users may fall into the hands of unauthorized persons.

If a proper username and password are supplied, it is impossible for an entity such as a financial institution operating an online banking service or the like to know that the username and password were supplied by an unauthorized user. Improved security procedures are sorely needed for protection of customer financial and other transactions.

The typical computer presently in use possesses many unique features. Even computers from the same manufacturer and of the same model possess differing features, such as surface characteristics of hard disks and the like. Once computers are placed into service, their characteristics diverge more and more, due to differing amounts of wear, different data written to and erased from the memory and hard disk and other features which are altered by use, such as differences caused by differing frequency of running of defragmentation programs and errors in storage of data, such as lost clusters and the like. If data could be extracted based on the unique features of a computer, this data could be used to authenticate the computer to a remote server or entity.

In addition, unique features of a computer or other data processing equipment could be used to provide control over software execution, or encryption of customer data. Many consumer applications involve the use of software in which the distributor gives physical possession of the software media to a consumer, but to wishes to continue to exert control over the use of the software. This may occur, for example, when a vendor wishes to distribute a digital video disc (DVD) to a consumer and to allow only limited use of the disc, such as playing it only on a single player or for a specified number of plays. Other applications involve the use of software or data which is confidential in nature, such as consumer credit or debit card information. It may be advantageous for a consumer to have a database of credit card information stored on his or her own computer, but highly undesirable for someone else to be able to copy that information and view or use it on a different computer.

There exists, therefore, a need in the art for techniques which employ unique features of data processing systems to allow for authentication of a computer or other storage medium, for installation of software or data to a storage medium in a way which prevents proper operation if the software or data is copied to another storage medium without authorization, and for providing encryption for data installed to a storage medium, which will render the software or data unreadable if copied to a different storage medium.

SUMMARY OF THE INVENTION

A system according to the present invention employs the unique features of a computer system or other data processing and storage system as a source of information for authentication and protection of data. A software installation is made to a storage medium of a computer system. After the installation is made, a search is made for locations containing selected elements of the software installation. The contents of these locations are employed to create cryptoprocessing keys. During an initial registration system with a remote server, such as a server controlled by a financial entity offering online banking services, the keys are transmitted to the remote server through a secure connection, such as a connection employing public key cryptography using a key employed by the server. During subsequent communications with the remote server, the cryptoprocessing keys are used to encrypt information for transmission to the server, such as date and time information and a password supplied to the user. When the server successfully uses the cryptoprocessing keys to decrypt the transmitted information, the server receives a high level of assurance that the computer used in the transmission is the original computer used for registration.

In addition to examining locations of elements of a software installation as a source of unique data, alternative techniques are also possible. For example, the typical computer hard disk has a number of defective blocks which are introduced during the manufacturing process and which are unique to the disk. These blocks are identified in a manufacturer's defective block table, supplied with the disk and unique to the disk. Data in the table may be used to create cryptoprocessing keys which will identify the disk whose information was used to generate the keys.

Some disks are adapted to be subjected to what is known as a stress read. This is a read operation in which tolerances are set tighter than normal, so that even a number of good blocks are read as bad. The results of a stress read operation are likely to be unique to a particular disk at a particular time. The results of a stress read operation provide a good source of unique data which can be used to create keys.

In order to exert control over operation of software or access to data, a process according to the present invention includes constructing software so as to use the specific locations where elements of the software are loaded as information needed for the operation of the software. When the software is installed, various program modules are placed in selected locations in the storage medium. The modules are linked to one another using location information relating to the particular installation. If an attempt is made to install the software to a different location, the program modules will be installed to different locations due to differences between the computer hosting the original installation and the computer hosting the new location. These differences may include differing amounts of installed memory, differing disk sizes, differing data present in memory and disk, and the like. It is highly unlikely that any two storage media will possess the same characteristics relating to available disk and memory space for installation, and for this reason installations to different storage media will differ in this regard. If the software is copied to a second storage medium, the links between modules will point to the original locations, but the modules will no longer be present at the original locations of the first installation.

Moreover, it is also possible to use unique data relating to a software installation to provide cryptoprocessing keys for data security. If a software installation is unique to a particular storage medium, large amounts of data will be available which will be unique to the storage medium. This data may be selected for use to create cryptoprocessing keys which may be used to encrypt or decrypt data stored on the storage medium. If the data is moved to a different storage medium, the data used to create the cryptoprocessing keys will not be available in the correct locations on the new storage medium, and data which has been moved will not be able to be used or read.

A more complete understanding of the present invention, as well as further features and advantages of the invention, will be apparent from the following Detailed Description and the accompanying drawings.

DETAILED DESCRIPTION

Figure 1:
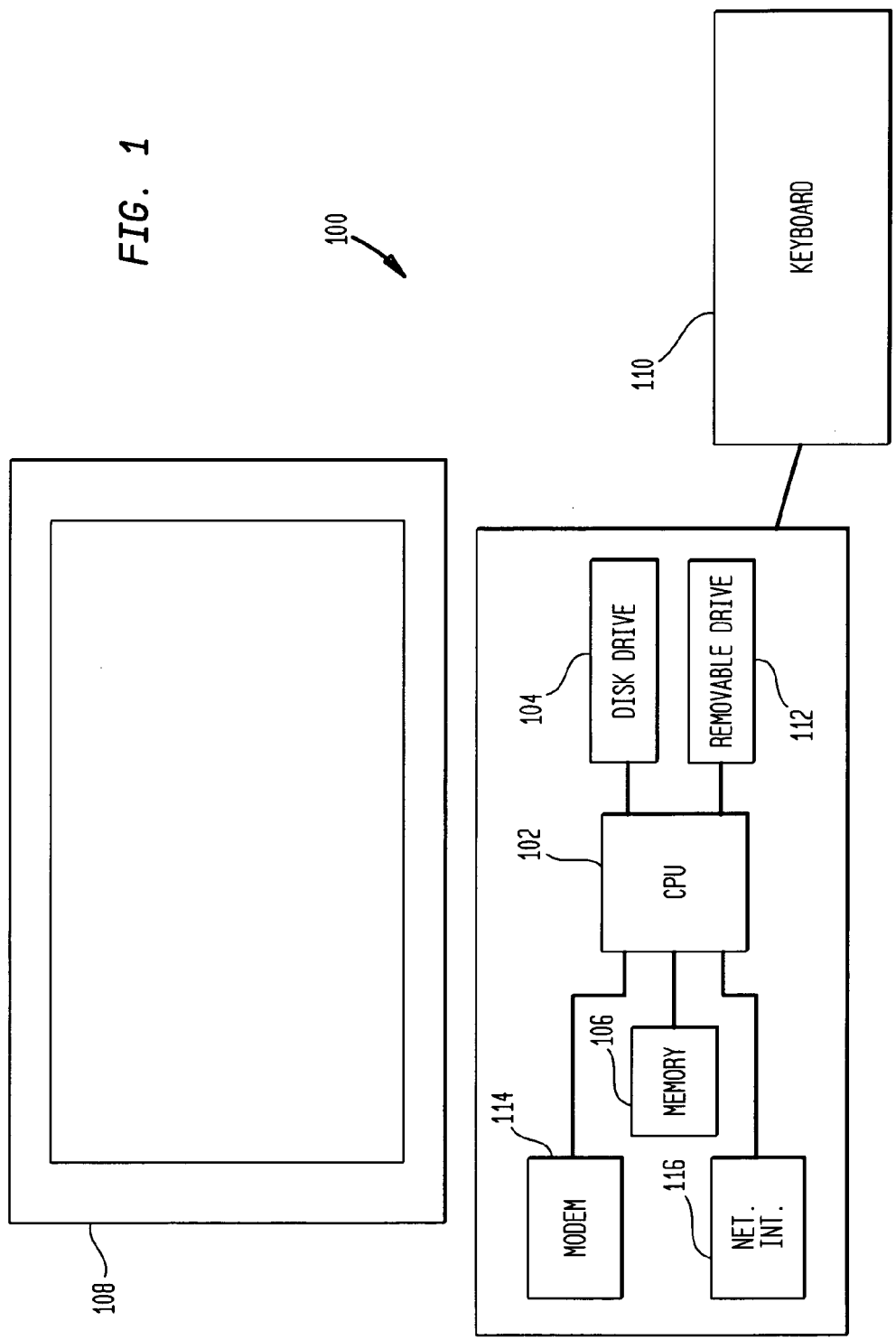
FIG. 1 illustrates a storage and processing system suitable for performing authentication according to the present invention and also suitable for receiving and executing a software image created and installed according to the present invention.

FIG. 1 illustrates a computer system 100 suitable for receiving and executing a software image according to the present invention. The computer system 100 includes a central processing unit (CPU) 102, disk drive 104, memory 106, user interface devices such as a monitor 108 and keyboard 110, removable storage device 112 and remote interfaces such as a modem 114 and network interface 116. The system 100 is adapted to receive and store software and data on the disk drive 104 and memory 106 or other storage media, placing the software and data in locations within the storage media according to protocols established in the design of the hardware and operating system employed by the system 100. In order to provide mechanisms for authentication, the computer system 100 may receive a software image which is installed to the hard disk 104.

A typical software installation is stored to the hard disk of a computer in a way which is not controllable by the user. Instead, installation proceeds automatically under the control of the computer's internal control systems, such as the operating system and basic input/output system. Depending on disk space available, elements of the software installation may be placed on various locations on the disk, with directions to the locations being provided by data available in the computer's file allocation table or a similar indexing or mapping function. If the software installation is copied from one location to another, it will be very difficult to duplicate the precise locations in which the software installation is placed. This phenomenon provides a good source of unique information which can be used to authenticate a specific computer.

Thus, the installation of a software image to the hard disk 104 provides unique information which can be used to identify the computer system 100. Upon installation of the software image, a search is made for locations which contain elements of the software installation. The contents of selected ones of the locations are then used to generate cryptoprocessing keys.

As an alternative to generating cryptoprocessing keys by searching for information in locations occupied by a software installation, data for use in generating processing keys may be obtained by examining the manufacturer's defective block table for the disk 104, or by performing a stress read operation on the disk 104 to generate a map or table of blocks identified as defective. In either case, the defective block information is used as data for the generation of cryptographic keys. If desired, a combination of any or all techniques of using locations occupied by a software installation, manufacturer's defective block information or defective block information identified as a result of a stress read operation may be employed to generate keys.

The key generation may be performed according to any of a number of widely known key generation techniques. The scope of the present invention is not limited to any one procedure for key generation.

Figure 2:
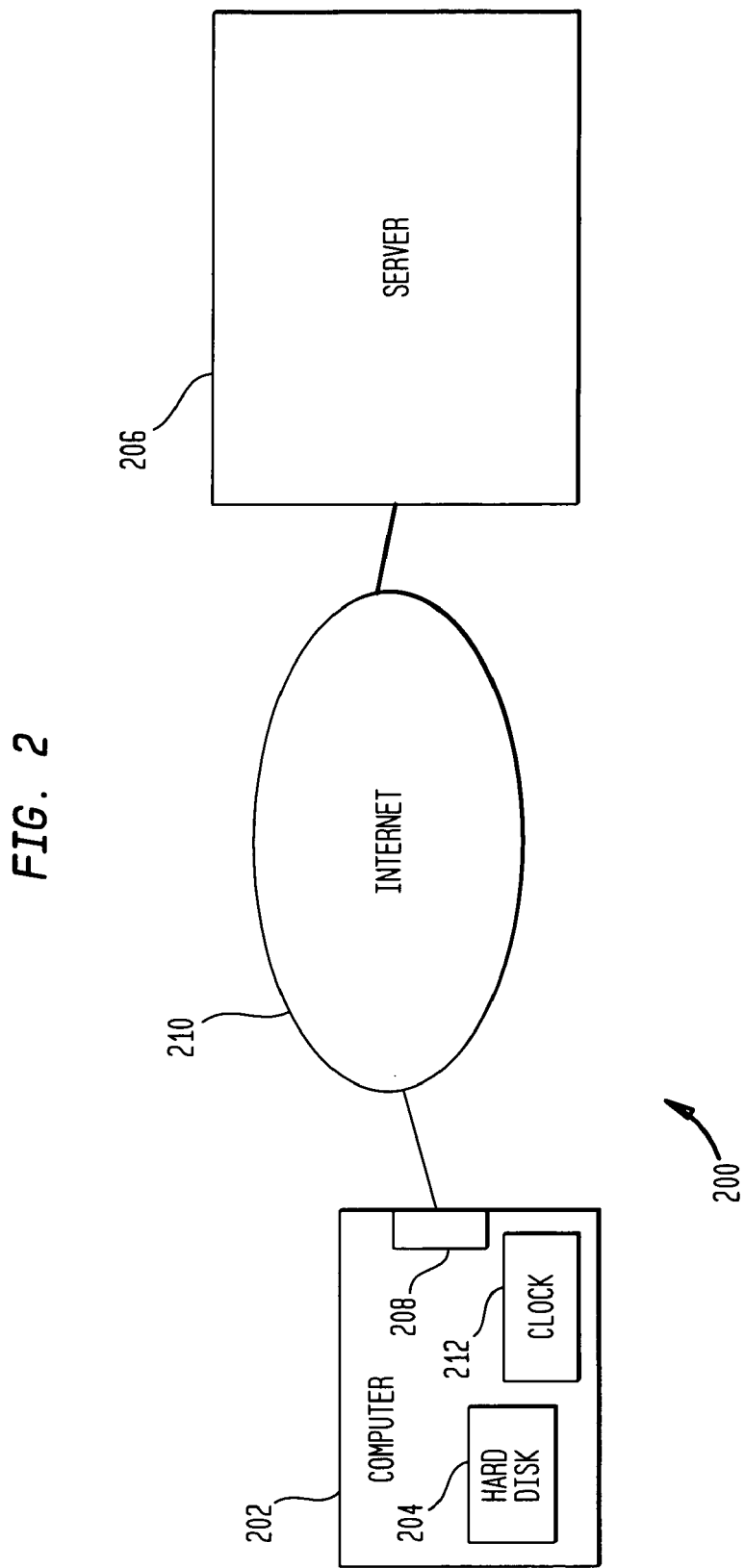
FIG. 2 illustrates a connection between a user-operated computer and a remote server adapted for authentication according to the present invention.

FIG. 2 illustrates a financial transaction connection 200 employing the principles of the present invention for authentication of a user's computer 202 to a server 204. The server 204 may suitably be a financial server belonging to a financial institution offering online banking or other financial services. The computer 202 is similar to the computer 100 of FIG. 1, and includes a hard disk 206 and remote interface 208. The computer 202 and the server 204 communicate over a connection such as the Internet 210.

When a customer contacts the server 204 to register for online services, the server 204 transmits an executable authentication file to the computer 202. When the authentication file is installed, it is placed on the hard disk 204 of the computer 202. The authentication file is placed in locations on the hard disk 204 in accord with the operating systems and protocols employed by the computer 202. A search is then made for locations containing selected elements of the authentication file. Location information for each of the selected elements is combined with the data contained in selected locations to construct data for use in generating cryptoprocessing keys. The location information for the authentication file is likely to be unique or nearly unique to the disk 204, because the locations to which the selected elements are recorded will be specific to the disk 204 because of characteristics such as amount of available space, locations of available space, defective blocks and other features. Moreover, placement of the authentication file is difficult or impossible for the user to control.

The derived from location information and other information relating to the authentication file is used to generate one or more cryptoprocessing keys using any of a number of techniques known in the art. The keys are then stored on the hard disk 204 of the computer 202, and also transmitted to the server 206. Transmission of the keys is preferably accomplished using secure methods such as public key cryptography in which the server 206 provides authentication information to establish the identity of the server 206. The server 206 also transmits a username and password to the computer 202, so that the user may employ the username and password to identify himself or herself to the server 206. Alternatively, the server 206 may allow the user to choose a username and password.

When subsequent contact is made between the computer 202 and the server 206, the authentication file is executed. The server 206 asks for entry of the username and password, and issues a request for authentication information to the authentication file. The authentication file accepts entry of the username and password and obtains time and date information from an internal clock 212 in the computer 202. The authentication file prepares an authentication package and encrypts the authentication package using a previously created cryptoprocessing key. The authentication package is transmitted to the server 206 which decrypts the authentication package using the key which was received during the registration process.

As an alternative to using data relating to the authentication file for creation of cryptoprocessing keys, it is also possible to use data from the manufacturer's defective block table for the disk 204, or to perform a stress read operation on the disk 204 to produce defective block data unique to the disk 204. Data produced by any or all of these techniques may be used to generate one or more cryptoprocessing keys. Creation and use of cryptoprocessing keys operates independently from the techniques chosen to generate data used to create the keys.

As an alternative to generating encryption keys and using the keys to encrypt an authentication package, it is also possible to use one or more authentication codes to authenticate the computer 202 to the server 206. An authentication code is preferably a series of numbers or other data relating to unique features of the disk 204, such as location information of software, manufacturer's defective block table, or defective block information resulting from a stress read operation. If it is desired to use authentication codes for authentication, the computer 202 produces the authentication codes during initial registration with the server 206 and transmits them to the server 206. During subsequent communication with the server 206, the computer 202 transmits the previously produced authentication codes to the server 206. The server 206 retrieves the authentication codes previously received from the computer 202 during registration and compares them with the authentication code received during the subsequent communication. If the authentication codes match, the computer 202 is authenticated to the server 206.

Figure 3:
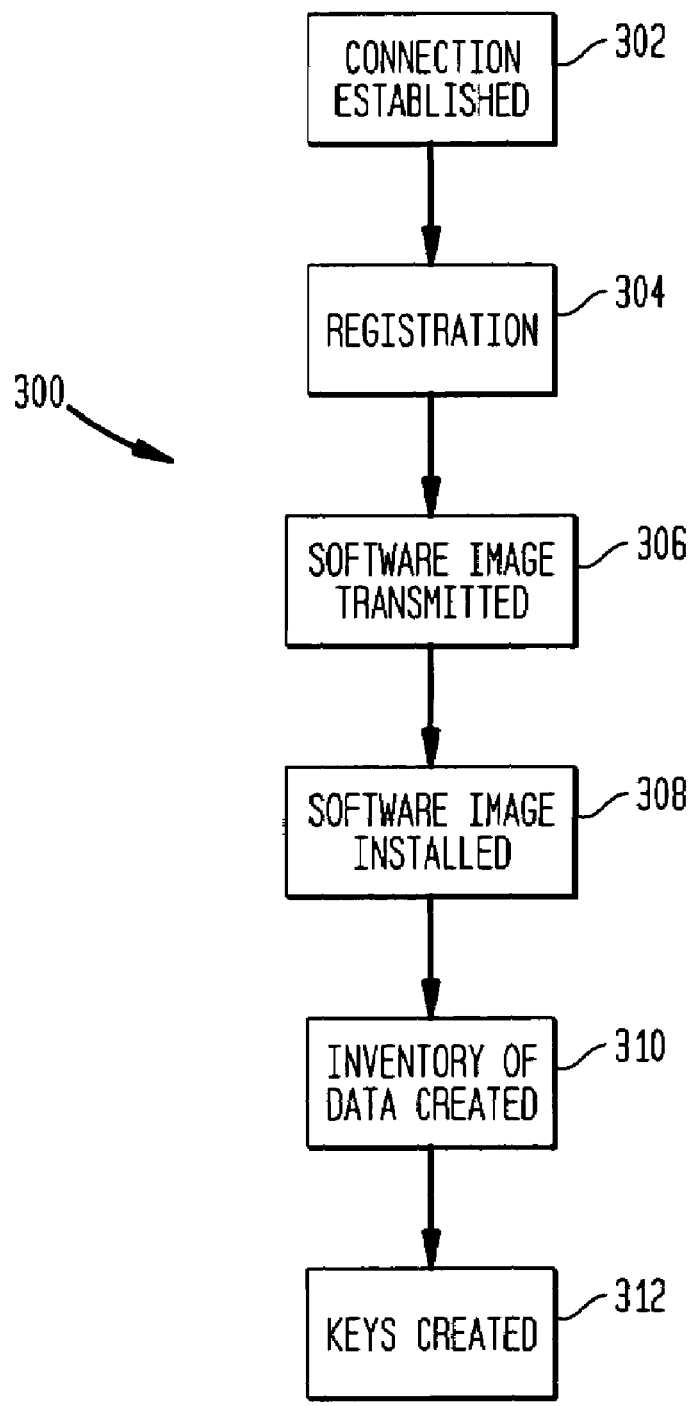
FIG. 3 illustrates a process for generating cryptoprocessing keys according to the present invention.

FIG. 3 illustrates a process 300 for cryptoprocessing key generation according to the present invention. At step 302, a connection is established between a user-operated computer and a remote server. At step 304, a registration process is performed to establish terms and conditions by which the remote server will provide services and conduct transactions upon instructions received from the user-operated computer. At step 306, a software image is transmitted from the remote server to the user-operated computer. The software image may suitably be an authentication program adapted to perform operations for authenticating the user-operated computer to the remote server. At step 308, the software image is installed to the user-operated computer. At step 310, data relating to the installation of the software image is used to create an inventory of data unique to the user-operated computer for use in creating cryptoprocessing keys. The data may suitably include data relating to locations in which selected elements of the software image are stored, and the contents of the locations. Alternatively, an inventory of data may be created using the manufacturer's defective block table for a hard disk in the user-operated computer, or as a further alternative the inventory of data may be created using results of a stress read operation creating defective block information for a hard disk in the user-operated computer.

At step 312, the inventory of data is used to create one or more cryptoprocessing keys. At step 314, the one or more cryptoprocessing keys are transmitted to the remote server.

Figure 4:
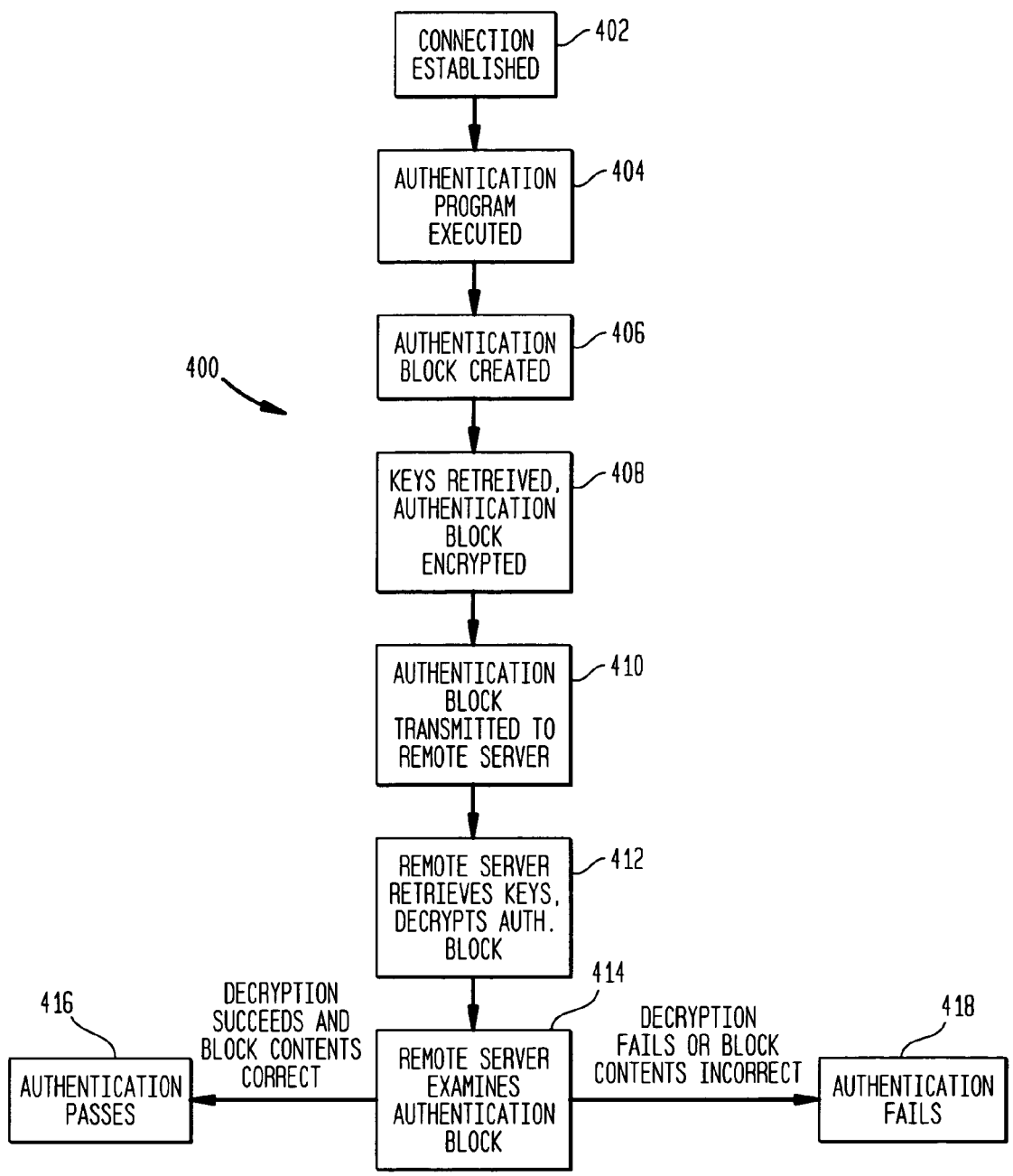
FIG. 4 illustrates a process for authentication of a user-operated computer by a remote server according to the present invention.

FIG. 4 illustrates a process for authenticating a user-operated computer to a remote server according to the present invention. At step 402, a connection is established between the user-operated computer and the remote server. At step 404, an authentication program is executed by the user-operated computer. At step 406, upon entry of identifying information by the user, such as a username and password, the user-operated computer under control of the authentication program retrieves time and date information an combines it with the identifying information to create an authentication block. At step 408, the user-operated computer retrieves previously created cryptoprocessing keys, created in a process such as the process 300 of FIG. 3, and encrypts the authentication block. At step 410, the user-operated computer transmits the authentication block to the remote server. At step 412, the remote server retrieves previously received cryptoprocessing keys, received in a process such as the process 300 of FIG. 3, and employs the keys to decrypt the authentication block. At step 414, the remote server examines the authentication block. If the authentication block was decrypted correctly and contains correct information, the process proceeds to step 416 and the remote server authenticates the user-operated computer. If the authentication block was not decrypted correctly or does not contain correct information, the process proceeds to step 418 and the remote server rejects authentication of the user-operated computer.

In addition to performing authentication, it is possible to use the principles of the present invention to control installation and operation of software or to provide a source of data for cryptoprocessing of private data stored on a user-operated computer or other processing and storage system. Software images are modified from prior art software images in order to incorporate information specific to the particular installation in order to provide control over operation and to provide a source of unique data for use in cryptoprocessing.

Figure 5:
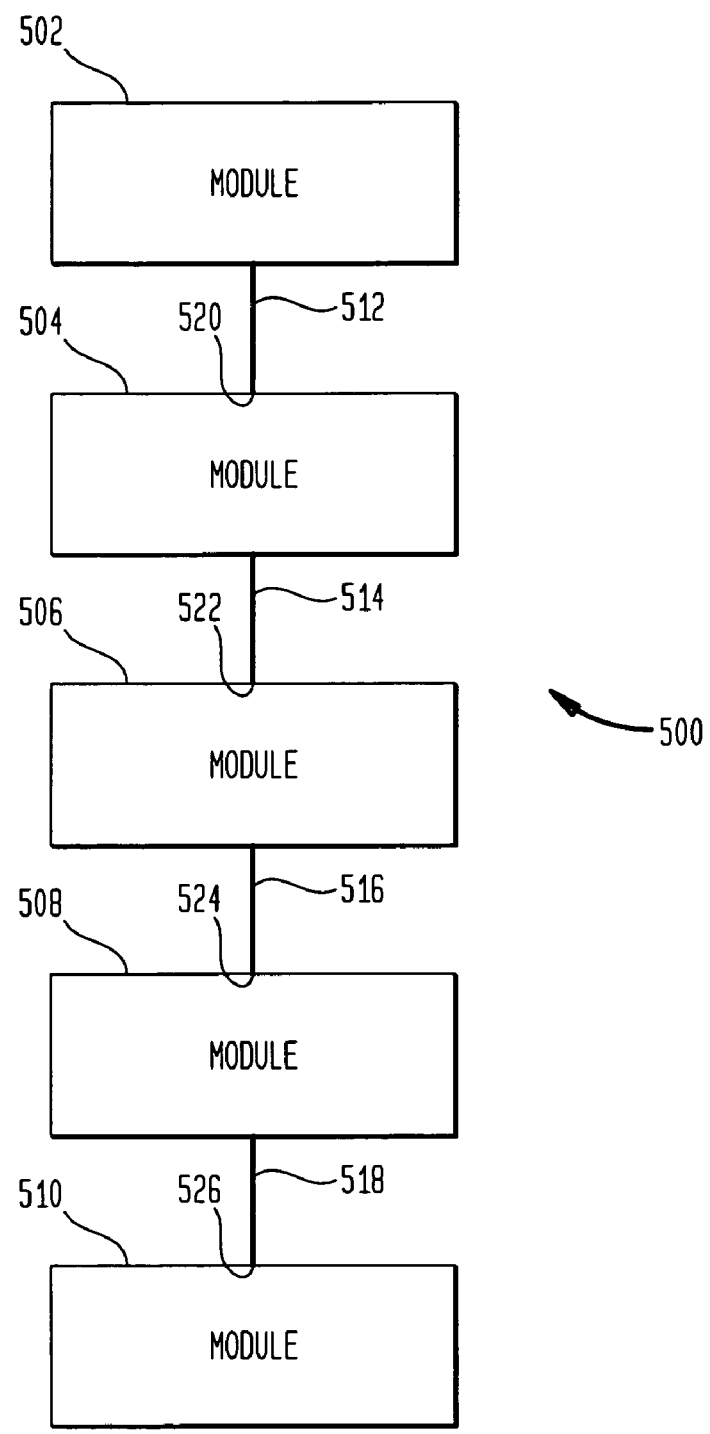
FIG. 5 illustrates a prior art software image.

FIG. 5 illustrates a software image 500 according to the prior art. The software image 500 includes first through fifth program modules 502-510. The program modules include links 512-518 between the modules 502 and 510 so that each module successively links to the next module. Modules 504-510 include entry points 520-526. As seen in FIG. 2, the first module 502 includes the link 512 to the entry point 520 of the second module 504. The second module 504 includes the link 164 to the entry point 522 of the third module 506, and so on to the entry point 526 of the fifth module 510.

Linking from one program module to another must be performed correctly in order for the software image 150 to operate correctly. During a conventional installation of the software image 150, the links 512-518 linking modules 502-508 to successive modules are identified with the locations of the corresponding entry points 520-526 of the successive modules 504-510 to which linking is being accomplished.

Figure 6:
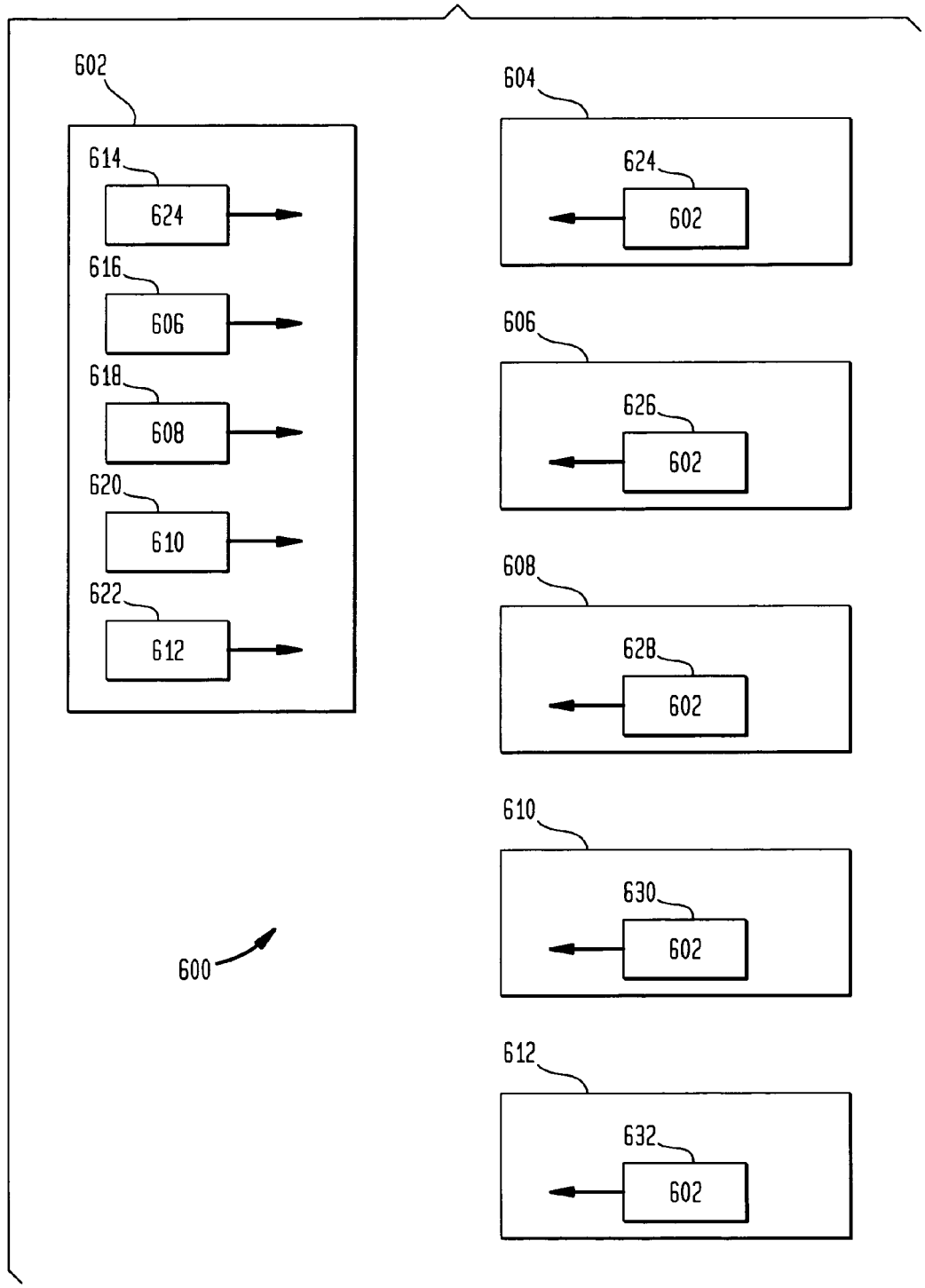
FIG. 6 illustrates an alternative prior art software image.

FIG. 6 illustrates an alternative software image 600 as installed according to the prior art. The software image 600 includes a master module 602 containing calls to a series of subroutine modules 604-612. As processing by each of the subroutines 604-612 is required, the master module 602 executes a link to the subroutine, such as the links 614-622. As each of the subroutines 604-612 finishes executing, it links back to the master module 602 using one of the return links 624-632. Each of the links 614-622 directs processing directly to the appropriate subroutine 604-612 and the return links 624-632 direct processing directly to the appropriate point in the master module 602. When the software image 600 is installed and executed, conventional mapping techniques are employed to translate the links 614-622 and the return links 624-632 to the appropriate memory locations where the various components of the software image 600 reside.

Figure 7:
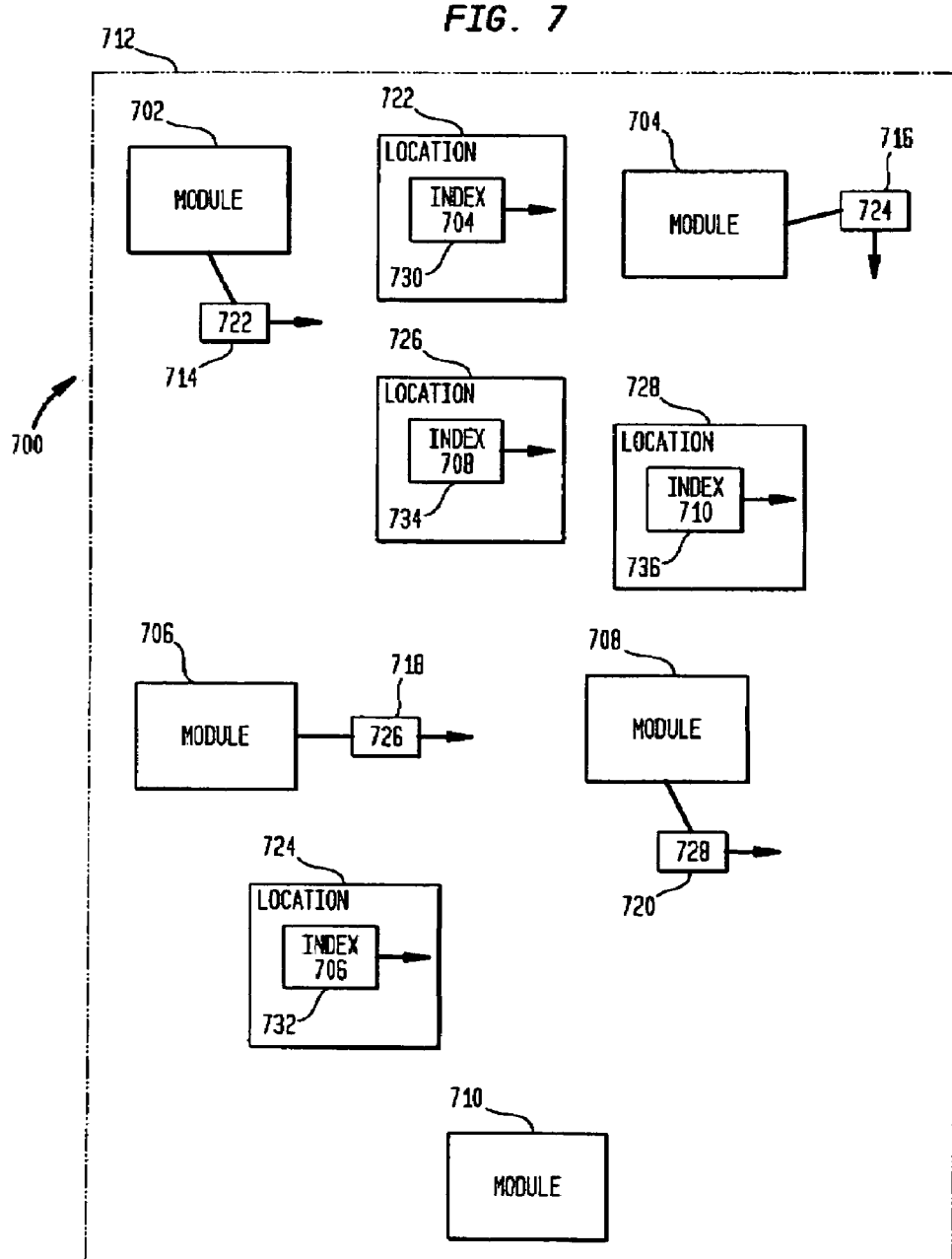
FIG. 7 illustrates a software image designed according to the present invention.

FIG. 7 illustrates a software image 700 employing the techniques of the present invention. The software image 700 includes first through fifth modules 702-710, respectively, installed in a storage medium 712. The first through fifth modules 702-710 are not located contiguously within the storage medium 712, and do not contain direct links to one another. Instead, each of links 714-720 points to a location 722-728 containing an index 730-736, which in turn points to the entry point of the following module 704-710. In order to provide added security, the location pointed to by the link is processed so that it must be reprocessed in order to establish a location for the module which is unique to the particular software image 700. For example, if the link 714 comprises a pointer to a 32-bit address which is the address of the module 704, the 32-bit address in the pointer is processed by performing an exclusive OR operation using the address and a randomly chosen constant as arguments. The result of the exclusive OR operation is placed in an index in the location indicated by the link 714, which in this case is the location 722. Prior to program installation, the link 714 may comprise a GOTO or GOSUB command with the address as an argument. Upon installation, the GOTO or GOSUB command is replaced with a GOTO INDEX or GOSUB INDEX command. The address pointer proceeds to the location 722, which contains the index 730. The index 730 contains the result of the exclusive OR operation.

For example, if the link 714 to the module 704 contains the hexadecimal address 0140, the value 0140 may be subjected to an exclusive OR operation with a randomly chosen value, for example 6131. This operation would yield the hexadecimal value 6071, which is used as an index value. The hexadecimal value 6071 is placed in the location 722, which is the hexadecimal address 0140. The link 714 points to the index value 730 contained in the location 722, or address 0140. This value is the hexadecimal address 6071, so that the link connects to the address 6071.

Upon installation of the software image 700, all of the links 714-720 are assigned to indices 730-736 which have as contents results of XOR operations on the destination address indicated by the link and a randomly chosen constant. Each of the modules 704-710 which is linked to in this fashion is placed in the location indicated by the address pointed to by the index 730-736. For example, the entry point of the module 704 is placed in the location 6071, and similar placements are performed for the remaining modules 706-710. If a generated address location is occupied or otherwise unsuitable, the index is recomputed and placement is attempted until a successful placement is made.

An installation program used for installing the software image 700 may be designed to refuse to allow an attempt to install the software image 700 to another storage medium. This design is particularly easy to accomplish if the software image 700 is distributed only in the form of a download, because the installation program can be run remotely from the download site, so that the user who downloads the software image 700 has no access to the installation program. If an attempt is made to copy the software image 700 to another storage medium, the links 714-720 will remain unchanged, but the various program modules will be located in various locations in the new storage medium depending on what space is available and the rules for space allocation utilized by the new storage medium. The program modules will not be in the locations pointed to by the links, and proper operation will be impossible. It is possible to design an installation program for installing the software image 700 to allow for multiple or consecutive installations, if desired, but unauthorized copying and use can be effectively prevented. This is because an installation program can be designed to keep track of the number of installations that have been made and perform a fresh installation, creating new links between modules, the links employing location information obtained from the storage medium into which the fresh installation is being made. The installation program can be designed to refuse to operate if an attempt is made to perform an installation in an unauthorized manner. For example, the installation program can refuse to perform a fifth installation if it is designed to allow only four installations. Because each installation employs location information specific to the storage medium into which installation is made, it is difficult or impossible to circumvent the installation program by simply copying the installation into a new storage medium.

While the software image 700 is illustrated here as comprising five modules 702-710, it will be recognized that the typical software installation comprises large amounts of code and large numbers of modules. For the typical software image constructed and installed in a manner similar to the software image 700, it would represent an excessive burden for an attacker to modify each of the links so that the software would operate properly when copied to a new storage medium.

Figure 8:
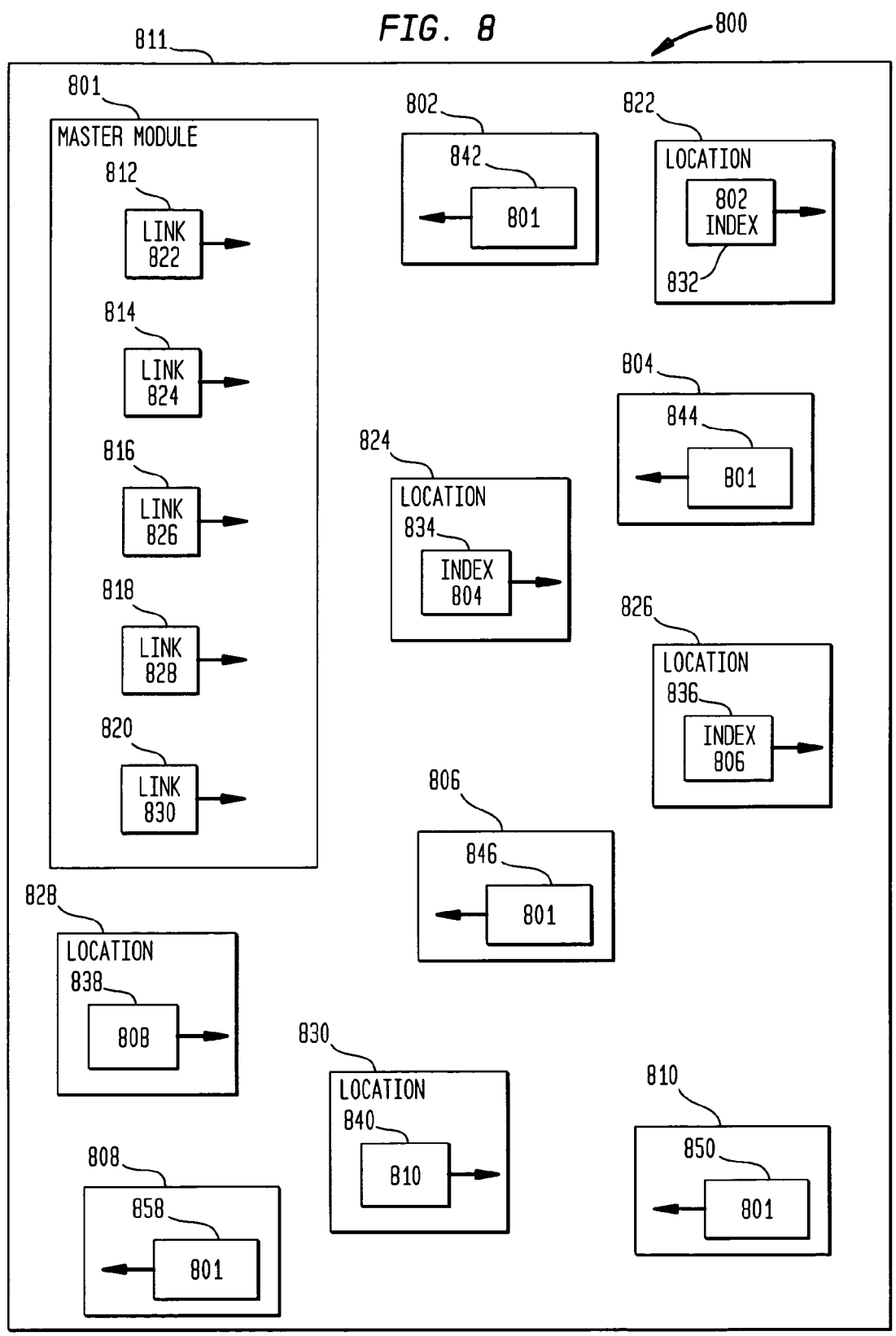
FIG. 8 illustrates a software image according to an alternative aspect of the present invention.

FIG. 8 illustrates an alternative software image 800 employing the techniques of the present invention. The software image 800 includes a master module 801 which controls the execution of first through fifth subroutine modules 802-810, respectively, installed in a storage medium 811. The first through fifth subroutine modules 802-810 are not located contiguously within the storage medium 811. The master module 801 does not contain direct links to the subroutine modules 802-810, and the subroutine modules 802-810 do not contain direct return links to the master module 801. Instead, each of links 812-820 points to a location 822-830 containing an index 832-840, which in turn points to the entry point of the subroutine module 802-810. In order to provide added security, the location pointed to by the link is processed in order to establish a location for the module which is unique to the particular software image 800. For example, if the link 812 comprises a pointer to a 32-bit address which is the address of the module 802, the 32-bit address in the pointer is processed by performing an exclusive OR operation using the address and a randomly chosen constant as arguments. The result of the exclusive OR operation is placed in an index in the location indicated by the link 812, which in this case is the location 822. Prior to program installation, the link 812 may comprise a GOTO or GOSUB command with the address as an argument. Upon installation, the GOTO or GOSUB command is substituted for a GOTO INDEX or GOSUB INDEX command, where the address pointer proceeds to a location in the index 832, which has as an argument the result of the exclusive OR operation. Upon installation of the software image 800, all of the links 812-820 are processed to point to locations 822-830 containing indices 832-840 which have as contents results of XOR operations on the destination address indicated by the link and a randomly chosen constant. Each of the modules 802-810 which is linked to in this fashion is placed in the location indicated by the address pointed to by the associated one of indices 832-840.

An installation program used for installing the software image 800 may be designed to refuse to allow an attempt to install the software image 800 to another storage medium. This design is particularly easy to accomplish if the software image 800 is distributed only in the form of a download, because the installation program can be run remotely from the download site, so that the user who downloads the software image 800 has no access to the installation program. If an attempt is made to copy the software image 800 to another storage medium, the links 812-820 will remain unchanged, but the various program modules will be located in various locations in the new storage medium depending on what space is available and the rules for space allocation utilized by the new storage medium. The program modules will not be in the locations pointed to by the links, and proper operation will be impossible.

While the software image 800 is illustrated here as comprising five modules 802-810, it will be recognized that the typical software installation comprises large amounts of code and large numbers of modules. For the typical software image constructed and installed in a manner similar to the software image 800, it would represent an excessive burden for an attacker to modify each of the links so that the software would operate properly when copied to a new storage medium.

Figure 9:
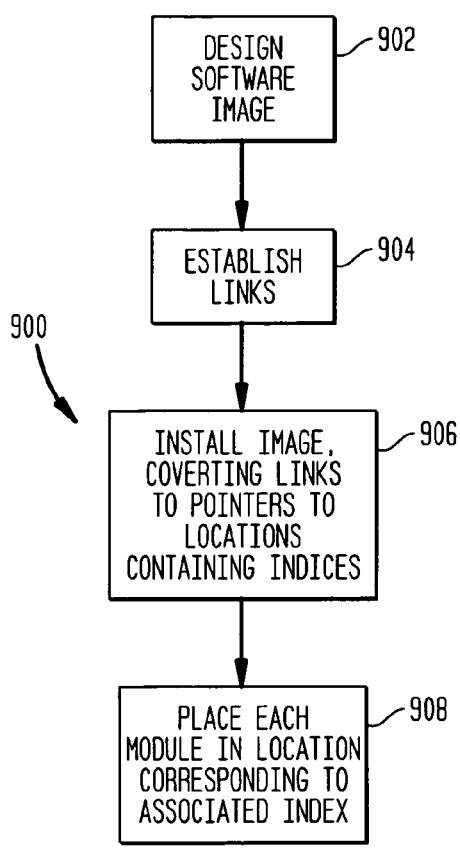
FIG. 9 illustrates a process of designing and installing software according to the present invention.

FIG. 9 illustrates a process 900 for installing software to prevent unauthorized use of the software when copied to a storage medium other than the original storage medium to which the software was installed. At step 902, a software image is established comprising a plurality of software modules. The software modules may include a series of consecutively executing modules, a master module controlling execution of a number of subroutine modules, or a combination of the types. At step 904, links are established between modules to control program flow between modules. At step 906, the software image is installed to a storage medium. At installation, the links between modules are converted to pointers to indices with the indices pointing to particular locations in the storage medium. The locations pointed to by the indices are preferably generated through the use of randomly chosen factors. At step 908, each module is placed in a location pointed to by its corresponding index.

In order to provide security for private data stored to a storage medium, it is possible to employ a software installation according to the present invention for encryption of the private data. For example, a computer user may wish to store a list of credit card information in a database stored on his or her computer, but may be reluctant to do so because of doubts about the security of the information. It would be advantageous to employ a software installation according to the present invention to provide security for a database.

Figure 10:
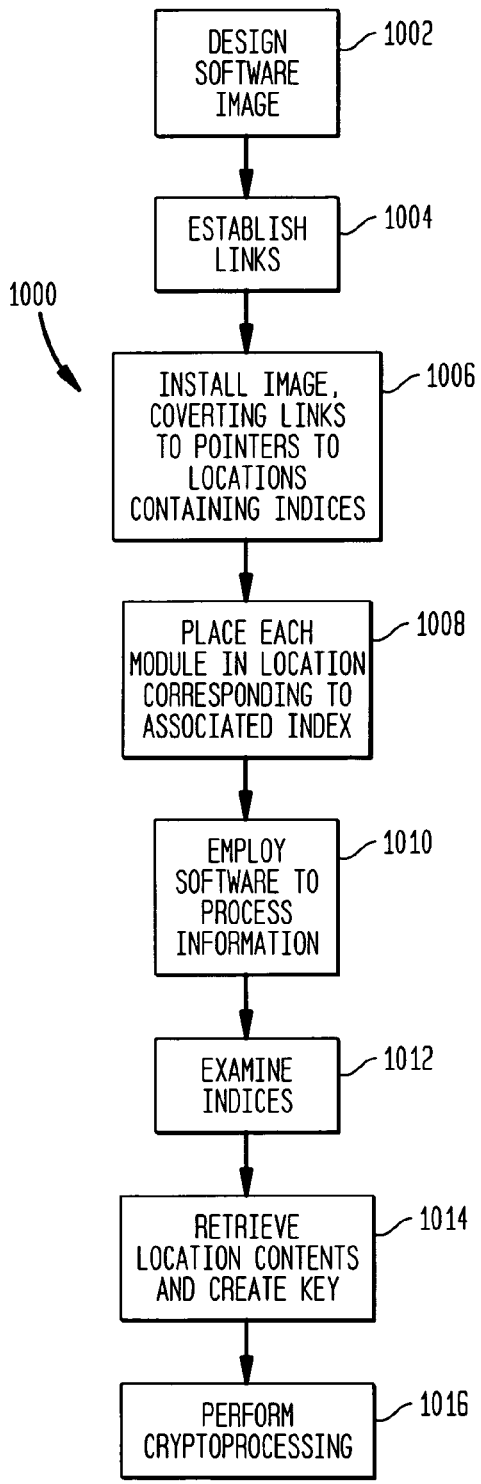
FIG. 10 illustrates a process of cryptoprocessing employing location features of a software installation according to the present invention.

FIG. 10 illustrates a process 1000 for installing software according to the present invention and employing location information relating to a specific installation to provide encryption capability for data stored to the storage medium containing the software installation. At step 1002, a software image is established comprising a plurality of software modules. The software installation designed may suitably be a database package. The software modules may include a series of consecutively executing modules, a master module controlling execution of a number of subroutine modules, or a combination of the types. At step 1004, links are established between modules to control program flow between modules. At step 1006, the software image is installed to a storage medium. At installation, the links between modules are converted to pointers to indices with the indices pointing to particular locations in the storage medium. The locations pointed to by the indices are preferably processed through the use of randomly chosen factors. At step 1008, each module is placed in a location pointed to by its corresponding index. At step 1010, the software employed to receive and process information and create a database of the information. At step 1012, one or more of the indices pointing to a particular location in the storage medium is examined to determine the location pointed to by the storage medium. At step 1014, the contents of each location are retrieved and used to create a cryptoprocessing key. At step 1016, cryptoprocessing on the database contents is performed using the cryptoprocessing key.

The method described above provides security for database contents or other information stored on a computer or other storage medium, because the database is stored in an encrypted form. If the database is copied to another storage medium, it will not be accessible because the key used to encrypt it will not be present. If the database is copied to another storage medium, along with the database program, the database program modules will not be in the correct locations and the database program will not operate correctly. Moreover, even if the key generation features of the database program can be made to work, the correct key will not be generated, because the contents of the memory locations which were examined to create the key will not be the same in the new installation, and the data used to create the original key will not be present. It will therefore be difficult for an unauthorized party to copy the database to another storage medium for examination.

While the present invention is disclosed in the context of a presently preferred embodiment, it will be recognized that a wide variety of implementations may be employed by persons of ordinary skill in the art consistent with the above discussion and the claims which follow below.

I claim:

1. A method of authentication of a data processing and storage system, comprising the steps of:
   generating a cryptoprocessing key based on unique features of data present in the data processing and storage system; and
   using the a cryptoprocessing key to process data for transmission to a remote server in order to identify the processed data as originating from the data processing and storage system.

2. The method of claim 1 wherein the step of generating a cryptoprocessing key comprises storing a software image to the data processing and storage system and using information relating to storage locations of selected elements of the software image in order to generate the cryptoprocessing key.

3. The method of claim 1 wherein the step of generating a cryptoprocessing key comprises using information relating to defective blocks of a hard disk in the data storage system to generate the cryptoprocessing key.

4. The method of claim 3 wherein the information relating to defective blocks is obtained from a manufacturer's defective block table associated with the hard disk.

5. The method of claim 3 wherein the information relating to defective blocks is produced by performing a stress read of the hard disk to generate defective block information.

6. A method of generating a cryptoprocessing key for authenticating a user-operated computer to a remote server, comprising the steps of:
   establishing a connection between the user-operated computer to the remote server;
   transferring an authentication program from the remote server to the user-operated computer;
   installing the authentication program to the user-operated computer;
   creating an inventory of data relating to unique feature of data storage of the user-operated computer; and
   using the inventory of data generate the cryptoprocessing key.

7. The method of claim 6 wherein the step of creating the inventory of data includes obtaining location information relating to selected elements of the authentication program.

8. A method of authenticating a user-operated computer to a remote server, comprising the steps of:
   establishing a connection between the user-operated computer and the remote server;
   executing an authentication program on the user-operated computer to create an authentication block for use in authenticating the user-operated computer, the authentication block including data previously exchanged between the remote server and the user-operated computer;
   encrypting the authentication block using a previously generated cryptoprocessing key created using an inventory of data relating to unique features of data storage on the user-operated computer;
   transmitting the authentication block to the remote server;
   decrypting the authentication block at the remote server using the previously generated cryptoprocessing key; and
   verifying the contents of the authentication block at the remote server.

9. A method of installation of a software image to a specific storage medium, comprising the steps of:
   creating a software image comprising a plurality of software modules connected by links;
   associating each link with a software module;
   processing each link to include location information specific to the specific storage medium; and
   placing each module associated with a link in a location corresponding to location information included in the associated link.

10. The method of claim 9 wherein the step of processing the links includes choosing randomly selected data for each link and processing the link using the randomly selected data.

11. The method of claim 10 wherein the step of processing the links includes creating an index in a link location pointed to by each link and placing a index value in the index, the value comprising a result of processing the link location using the randomly selected data.

12. The method of claim 11 wherein the index value is the result of an exclusive OR operation between the link location and the randomly selected data.

13. A method of data cryptoprocessing comprising:
   installing a software image comprising a plurality of modules connected by links between the modules to a storage medium by:
     associating each link with a software module;
     processing each link to include location information specific to the storage medium;
     placing each module associated with a link in a location corresponding to location information included in the associated link;
   choosing selected links;
   selecting data from the location corresponding to the location information included in each of the selected links; and
   using the selected data to create cryptoprocessing keys; and
   cryptoprocessing data using the cryptoprocessing keys.

14. The method of claim 13 wherein the step of processing the links includes choosing randomly selected data for each link and processing the link using the randomly selected data.

15. The method of claim 14 wherein the step of processing the links includes creating an index in a link location pointed to by each link and placing a index value in the index, the value comprising a result of processing the link location using the randomly selected data.

16. The method of claim 15 wherein the index value is the result of an exclusive OR operation between the link location and the randomly selected data.

17. The method of claim 16 wherein the software image is a database for managing information to be stored in the storage medium and the data to be cryptoprocessed is data entered into and stored using the database.

18. A software installation on a recordable storage medium comprising:
   a plurality of software modules stored in locations in the storage medium;
   a plurality of links between the software modules, each link being associated with a software module, each link containing location information specific to the storage medium to provide flow control between modules.

19. The software installation of claim 18 wherein each link contains location information processed with randomly selected data.

20. The software installation of claim 19 wherein each link points to an index in a link location pointed to by the link and wherein the index contains a value resulting from processing the link location using randomly selected data and wherein the module associated with each link is placed in a location indicated by the index.

* * * * *